United States Patent
Venkatsubramanian et al.

(10) Patent No.: US 6,886,031 B2
(45) Date of Patent: Apr. 26, 2005

(54) EFFICIENT CONNECTION AND MEMORY MANAGEMENT FOR MESSAGE PASSING ON A SINGLE SMP OR A CLUSTER OF SMPS

(75) Inventors: Narayan Venkatsubramanian, North Billerica, MA (US); Terry D. Dontje, Maynard, MA (US); Steve Sistare, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 646 days.

(21) Appl. No.: 09/821,639

(22) Filed: Mar. 29, 2001

(65) Prior Publication Data

US 2002/0147785 A1 Oct. 10, 2002

(51) Int. Cl.⁷ .............................................. G06F 12/00
(52) U.S. Cl. ....................................... 709/213; 709/216
(58) Field of Search ............................... 709/213, 214, 709/215, 216

(56) References Cited

U.S. PATENT DOCUMENTS 5,613,068 A * 3/1997 Gregg et al. ................ 709/216
6,601,089 B1 * 7/2003 Sistare et al. ............... 709/213
6,766,358 B1 * 7/2004 Chesson et al. ............. 709/213

OTHER PUBLICATIONS

Stephen J. Fink and Scott B. Baden; "Non–Uniform Partitioning of Finite Difference Methods Running on SMP Clusters;" University of California, San Diego, CA, 10 pages.

A. Gürsoy and I. Cengiz; "Mechanisms for Programming SMP Clusters;" Bilkent University, Ankara, Turkey, 7 pages.

* cited by examiner

Primary Examiner—Kevin Verbrugge
(74) Attorney, Agent, or Firm—Osha & May L.L.P.

(57) ABSTRACT

A method for efficient connection establishment and use for message passing on a single symmetric multiprocessor node or on a cluster of symmetric multiprocessor nodes is provided. Further, a method of memory management for message passing on a single symmetric multiprocessor node or on a cluster of symmetric multiprocessor nodes is provided. The invention utilizes dynamic memory allocation for both memory needed for messages and acknowledgment memory segments. Moreover, a method for reclaiming memory used to send a message or piece thereof is provided.

41 Claims, 8 Drawing Sheets

EFFICIENT CONNECTION AND MEMORY MANAGEMENT FOR MESSAGE PASSING ON A SINGLE SMP OR A CLUSTER OF SMPS

BACKGROUND OF THE INVENTION

1. Field of the Invention

The present invention generally relates to message passing between multiple processes and more particularly to message passing in a multiple computer processor system.

2. Background Art

A computer system executes applications and programs in order to perform necessary and desired functions. Typically, one computer processor is responsible for executing the applications of the computer system in which the processor resides. However, there is a trend toward using multiple processors for executing applications.

Such multiprocessor systems have a plurality of processors, in close communication with one another, sharing system resources, i.e., memory, peripheral devices, etc. Thus, by using a multiprocessor system, execution throughput can be increased.

A typical architecture used by multiprocessor systems is the symmetric multiprocessing ("SMP") architecture, in which each of a number of processors in a machine share the memory available on the machine. SMP architecture provides fast performance by making different processors available to a number of processes on the machine simultaneously. In order to gain further performance out of SMP systems, many such systems are connected together and the processes running on each system communicate with each other via the use of some inter-process communication paradigm. A group of SMPs connected together to run an application is called a cluster of SMPs, and each SMP system in the cluster is referred to as an SMP node.

In a cluster of SMPs, different SMP nodes may have different amounts of processes. In order for the cluster of SMP nodes to execute and run a computer application, i.e., a user program, processes running on the processors in the same and/or different SMP nodes communicate with each other.

Several mechanisms have been developed to facilitate transfer of data among processors, and more specifically, between processing node memories. One mechanism for exchanging messages is referred to as "message passing." Several known message passing specifications have been developed, including Message Passing Interface ("MPI") and Parallel Virtual Machine ("PVM"). Generally, in message passing, in order to transfer data from one process to another, the transferring process generates a message including the data and transfers the message to another process. For example, when a first process needs to retrieve data from a second process, the first process generates a message, including a data retrieval request, and transfers the message to the second process from which data is to be retrieved. Subsequently, the second process executes the data retrieval request and transfers the data to the first process in a message as described above.

In a computer system constructed according to a distributed memory architecture, messages using the message passing mechanism are transferred between processing nodes over a network and processed or otherwise handled by a respective processing node when they arrive at a respective destination. In a computer system constructed according to a shared memory architecture, several buffer arrangements have been developed to facilitate message transfer.

Figure 1:
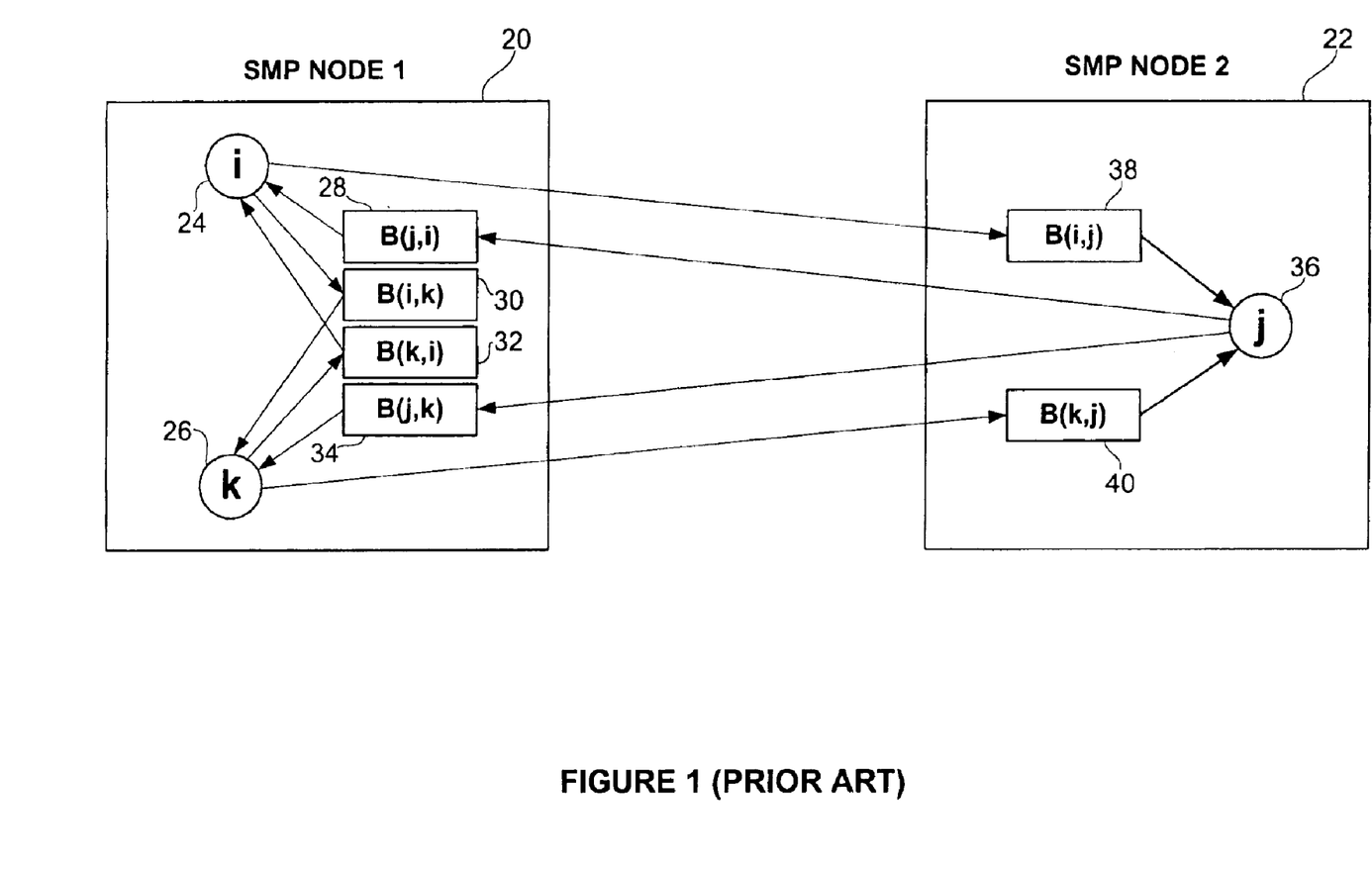
FIG. 1 shows a prior art embodiment of a message passing mechanism that uses a buffer for every process pair.

FIG. 1 shows a typical prior art embodiment of a shared memory architecture message transfer mechanism in which a plurality of processes are provided with a plurality of buffers, each associated with a particular process pair. FIG. 1 shows a first SMP node (20), on which two processes, an 'i-th' process (24) and a 'k-th' process (26), reside, and a second SMP node (22), on which a 'j-th' process (36) resides. When the 'i-th' process (24) transfers a message to the 'j-th' process (36), the 'i-th' process (24) deposits the message into a buffer, B(i,j) (38), that is specifically maintained to store data for the 'i-th' process (24) and the 'j-th' process (36) when the 'i-th' process (24) is a sending process, i.e., a process that sends a message, and the 'j-th' process (36) is a receiving process, i.e., a process that receives a message. Similarly, when the 'j-th' process (36) transfers a message to the 'i-th' process (24), the 'j-th' process (36) deposits the message into a buffer, B(j,i) (28), that is specifically maintained to store data for the 'j-th' process (36) and the 'i-th' process (24) when the 'j-th' process (36) is the sending process and the 'i-th' process (24) is a receiving process.

Once a message is deposited into a particular buffer, the receiving process can copy the contents of that buffer to its region of memory. For example, once the 'i-th' process (24) has deposited a message to B(i,j) (38), the 'j-th' process (36) can then retrieve the message by copying it to its region of memory, after which the 'i-th' process (24) can again transfer a message to the 'j-th' process (36).

The mechanism described above for message transfers between the 'i-th' process (24) and the 'j-th' process (36) can also be applied to message transfers between the 'i-th' process (24) and the 'k-th' process (26), using buffers B(i,k) (30) and B(k,i) (32), and between the 'j-th' process (36) and the 'k-th' process (26), using buffers B(k,j) (40) and B (j,k) (34).

Allocating buffers in the manner described above with reference to FIG. 1 ensures that there is no contention for buffers, e.g., memory space, between processes attempting to transmit messages to the same process. However, since each buffer has to be sufficiently large to be able to accommodate a large message, it is appreciated that a significant portion of memory address space may be required to maintain the plurality of buffers. Further, the portion of memory address space needed to maintain a plurality of buffers increases as the number of processes increase.

Figure 2:
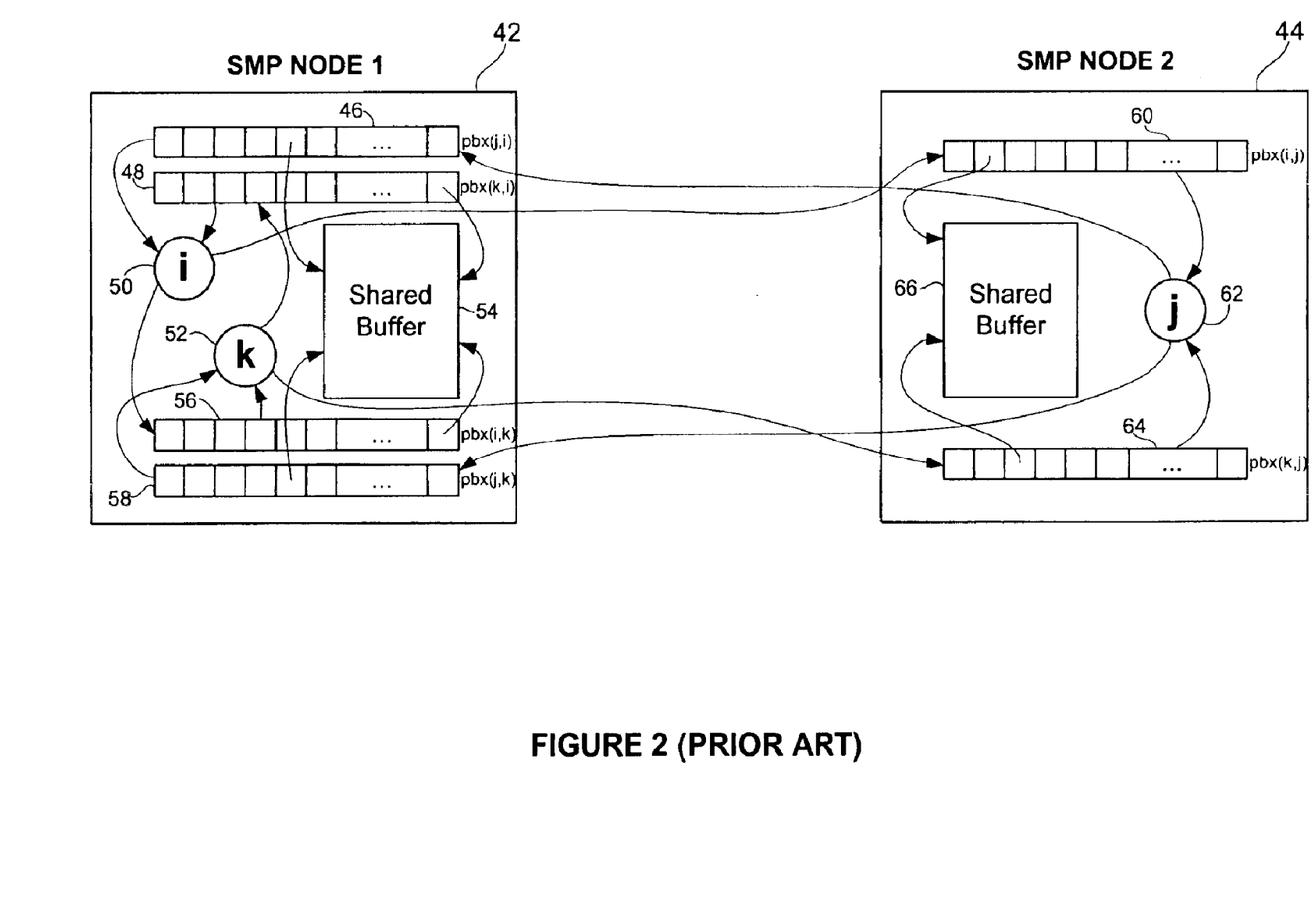
FIG. 2 shows another prior art embodiment of a message passing mechanism that uses postboxes and shared buffer pools.

In another mechanism, shown in FIG. 2, shared buffers are provided that include a plurality of buffers available to all processes. FIG. 2 shows a first SMP node (also referred to as "SMP Node 1") (42), on which an 'i-th' process (50), a 'k-th' process (52), and a first shared buffer pool (54), reside, and a second SMP node (also referred to as "SMP Node 2") (44), on which a 'j-th' process (62) and a second shared buffer pool (66) reside. Typically, buffers in the first and second shared buffer pools (54, 66) have sizes on the order of the sizes of the process pair buffers (28, 30, 32, 34, 38, 40) shown in FIG. 1. In addition to being provided a shared buffer pool, a process is provided with a relatively small buffer (also referred to as "postbox," "pbx," or "postbox portion") to transfer messages to a particular process.

When the 'i-th' process (50) transfers a message to the 'j-th' process (62), the 'i-th' process (50) first attempts to store the message in a postbox, pbx(i,j) (60), that is specifically maintained for message transfers between the 'i-th' process (50) and the 'j-th' process (62) when the 'i-th' process (50) is a sending process and the 'j-th' process (62) is a receiving process. If the message fits in pbx(i,j) (60), then the message is stored there for subsequent retrieval by the 'j-th' process (62). However, if the message does not fit in pbx(i,j) (60), the 'i-th' process (50) allocates a buffer from the 'j-th' process's (62) shared buffer pool (66), i.e., the second shared buffer pool (66), loads the message into the allocated buffer, and loads a pointer to the allocated buffer in pbx(i,j) (60) for the 'j-th' process (62). Thereafter, the 'j-th' process (62) can detect that a message or pointer has been loaded into pbx(i,j) (60) and then retrieve the message or pointer. If pbx(i,j) (60) contains a pointer, the 'j-th' process (62) can use the pointer to identify the allocated buffer from its shared buffer pool (66) and then retrieve the message by copying it to its region of memory. After the 'j-th' process (62) has retrieved the message from the allocated buffer from its shared buffer pool (66), the allocated buffer, i.e., memory, can then be returned to its shared buffer pool (66). In the case that the 'j-th' process (62) transfers a message to the 'i-th' process (50), the 'j-th' process (62) loads a message or pointer into a postbox, pbx(j,i) (46), that is specifically maintained for message transfers between the 'i-th' process (50) and the 'j-th' process (62) when the 'j-th' process (62) is the sending process and the 'i-th' process (50) is the receiving process.

The mechanism described above with reference to FIG. 2 for message transfers between the 'i-th' process (50) and the 'j-th' process (62) can also be applied to message transfers between the 'i-th' process (50) and the 'k-th' process (52), using postboxes pbx(k,i) (48) and pbx(i,k) (56), and between the 'j-th' process (62) and the 'k-th' process (52), using postboxes pbx(k,j) (64) and pbx (j,k) (58).

The message transfer mechanism described with reference to FIG. 2 reduces the amount of memory space that is needed relative to the amount of memory space that is needed in the message transfer mechanism described in FIG. 1, because the postboxes (46, 48, 56, 58, 60, 64) shown in FIG. 2 require less space than the buffers (28, 30, 32, 34, 38, 40) shown in FIG. 1. Moreover, the amount of shared buffer pools increases linearly with the amount of processes. However, some contention for memory space is possible with the message transfer mechanism described in FIG. 2. Typically, a lock/unlock mechanism is provided to synchronize access to shared buffer pools to ensure that a current sending process does not deposit a message into a particular buffer in the shared buffer pool in the case that a receiving process has not retrieved a message from a prior sending process that used the same buffer in the shared buffer pool that the current sending process is attempting to send a message to. However, lock/unlock mechanisms, which are used to stop subsequent processes from altering memory before a receiving process can copy that memory, can become a performance bottleneck when a large number of processes transfer messages simultaneously.

Figure 3:
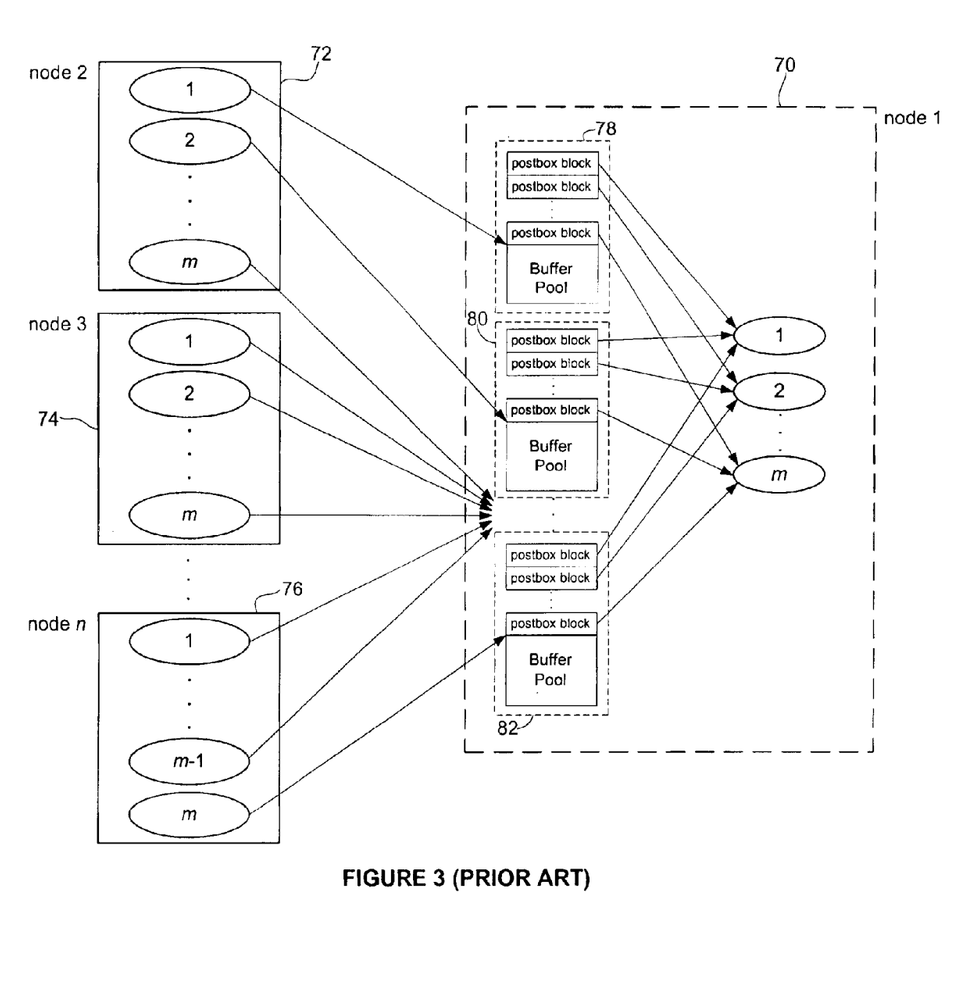
FIG. 3 shows another prior art embodiment of a message passing mechanism that uses buffers owned by sending processes.

FIG. 3 shows another prior art mechanism used to handle message transfer. This mechanism uses a sender owned buffer that is managed by each sending process. FIG. 3 depicts nodes 1 ... n (70, 72, 74, 76), where n represents the number of nodes in a particular system. In order to depict the mechanism shown in FIG. 3 more clearly, processes on nodes 2 ... n (72, 74, 76) transfer messages to processes on node 1 (70). However, those skilled in the art will appreciate that processes on node 1 (70) can transfer messages to processes on nodes 2 ... n (72, 74, 76).

Nodes 1 ... n (70, 72, 74, 76) each have processes 1 ... m, where m represents the number of processes on a particular node. Note that m can be different for different nodes. Each of the processes on nodes 1 ... n (70, 72, 74, 76) is allocated a region of common memory, which it uses in its processing operations. In the case of multiple nodes as shown in FIG. 3, each process is allocated a piece of memory on each node including the node on which the process itself resides. With reference to FIG. 3, the allocated memory regions (78, 80, 82) for processes 1 and 2 on node 2 (72) and process m on node n (76) are shown, respectively. Other processes shown on nodes 1 ... n (70, 72, 74, 76) also have allocated memory regions which are not shown in FIG. 3.

The allocated memory regions (78, 80, 82) are each divided into p postbox blocks and a buffer pool having q buffer blocks, where p represents the number of processes on the node to which it is sending a message and where q represents the number of buffer blocks in a particular buffer pool.

If process 1 on node 2 (72) needs to send a message to process 2 on node 1 (70), process 1 on node 2 (72) first attempts to load the message into a postbox in its allocated memory region (78) that is specifically maintained for transfers between process 1 on node 2 (72) and process 2 on node 1 (70) when process 1 on node 2 (72) is the sending process and process 2 on node 1 (70) is the receiving process. If the message is successfully loaded into the postbox, then process 2 on node 1 (70) can thereafter retrieve the message by copying it from the postbox to its region of common memory.

However, if the message is not small enough to fit in the postbox, then process 1 on node 2 (72) selects one of the buffer blocks from its allocated memory region (78), loads the message into that selected buffer, and stores a pointer to the selected buffer into the postbox that is specifically maintained for transfers between process 1 on node 2 (72) and process 2 on node 1 (70) when process 1 on node 2 (72) is the sending process and process 2 on node 1 (70) is the receiving process. Thereafter, process 2 on node 1 (70), the receiving process, can retrieve the message by first retrieving the pointer from the postbox described above, and then using the pointer stored in the postbox by process 1 on node 2 (72), the sending process, to identify the buffer block into which the message was loaded, and then copying the message from the buffer block into its common region of memory. Afterwards, the receiving process notifies the sending process that it can reuse the postbox for a future message.

Note that the mechanism described in FIG. 3 can also be applied for message transfers between any of the process shown in FIG. 3.

Moreover, with reference to FIG. 3, the number of allocated memory regions that need to be maintained by a system is known ahead of time since each sending process owns one allocated memory region. Also, since each allocated memory region is owned and maintained by one process, a lock/unlock mechanism is not needed.

SUMMARY OF INVENTION

The present invention provides new and improved ways to allocate memory for message passing to facilitate message transfer in a single shared memory symmetric multiprocessor ("SMP") or a cluster of SMPs.

In one aspect, a method of transmitting a first message from a first process on a first node to a second process on a second node comprises the first process defining a first process memory space on the second node, the first process assigning a separate postbox portion of the first process memory space for each respective process on the second node, and the first process storing the first message in the first process memory space and a first message indicator in the postbox portion of the first process memory space assigned to the second process.

In another aspect, a method of transmitting a first message from a first process to a second process on a second node comprises the first process determining if a postbox portion for the second process can store a first message indicator for the first message, the first process determining if there is sufficient unallocated first process memory space available to store the first message if the postbox portion for the second process can store the first indicator for the first message, the first process storing the first message in the first process memory space if there is sufficient unallocated first process memory space, and storing the first message indicator in the postbox portion of the first process memory space assigned to the second process.

In another aspect, a computing node comprises a first process memory space including a separate postbox portion for each process on the node, and a means for each process on the computing node to access a respective postbox portion to retrieve a message indicator identifying a location in the first process memory space of a message from the first process to the respective process on the computing node.

In another aspect, a method for managing memory when a process on a first node attempts to store a current message in a memory space on a second node comprises determining whether any acknowledgment signals have been received by the first node from a receiver of a previously sent message that used memory in the memory space, selectively reclaiming a postbox associated with the previously sent message if an acknowledgment signal has been received from the receiver of the previously sent message, and storing the current message if the postbox associated with the previously sent message is reclaimed.

In another aspect, a method for handling message transfers by selectively transferring a message in pieces comprises determining whether a size of a remaining message for a receiving process is greater than a cyclic transaction size, and storing the remaining message into a memory space if the size of the remaining message for the receiving process is not greater than the cyclic transaction size.

In another aspect, a method for recovering memory used for message transfers comprises maintaining a receiver list to track a plurality of receiving processes, wherein the plurality of receiving processes on the receiver list are maintained in an order in which the plurality of receiving process were communicated to by a sending process.

In another aspect, a method for recovering memory used for message transfers comprises attempting to recover memory used by a plurality of receiving processes by traversing a receiver list, and selectively recovering memory from those receiving processes on the receiver list that reside on a node which is the same as the node on which a receiving process resides.

In another aspect, a method for creating and handling a data memory segment and an acknowledgment segment when a first process on a first node needs to send a message to a second process on a second node comprises determining whether there is a data memory segment for the first process on the second node, creating the data memory segment for the first process on the second node if there is not already a data memory segment for the first process on the second node, determining whether there is an acknowledgment segment on the first node, and creating the acknowledgment segment on the first node if there is not already an acknowledgment segment on the first node.

Other aspects and advantages of the invention will be apparent from the following description and the appended claims.

DETAILED DESCRIPTION

The present invention relates to a method for improving memory management for message transfer between processes on symmetric multiprocessor ("SMP") nodes. The invention also relates to a method for establishing connections between processes on SMP nodes. Further, the invention relates to a method for improving SMP process communication using a remote shared memory ("RSM") protocol. The RSM module allows an area of memory on one computer to be visible or accessible as part of another computer's memory, i.e., address space.

Figure 4:
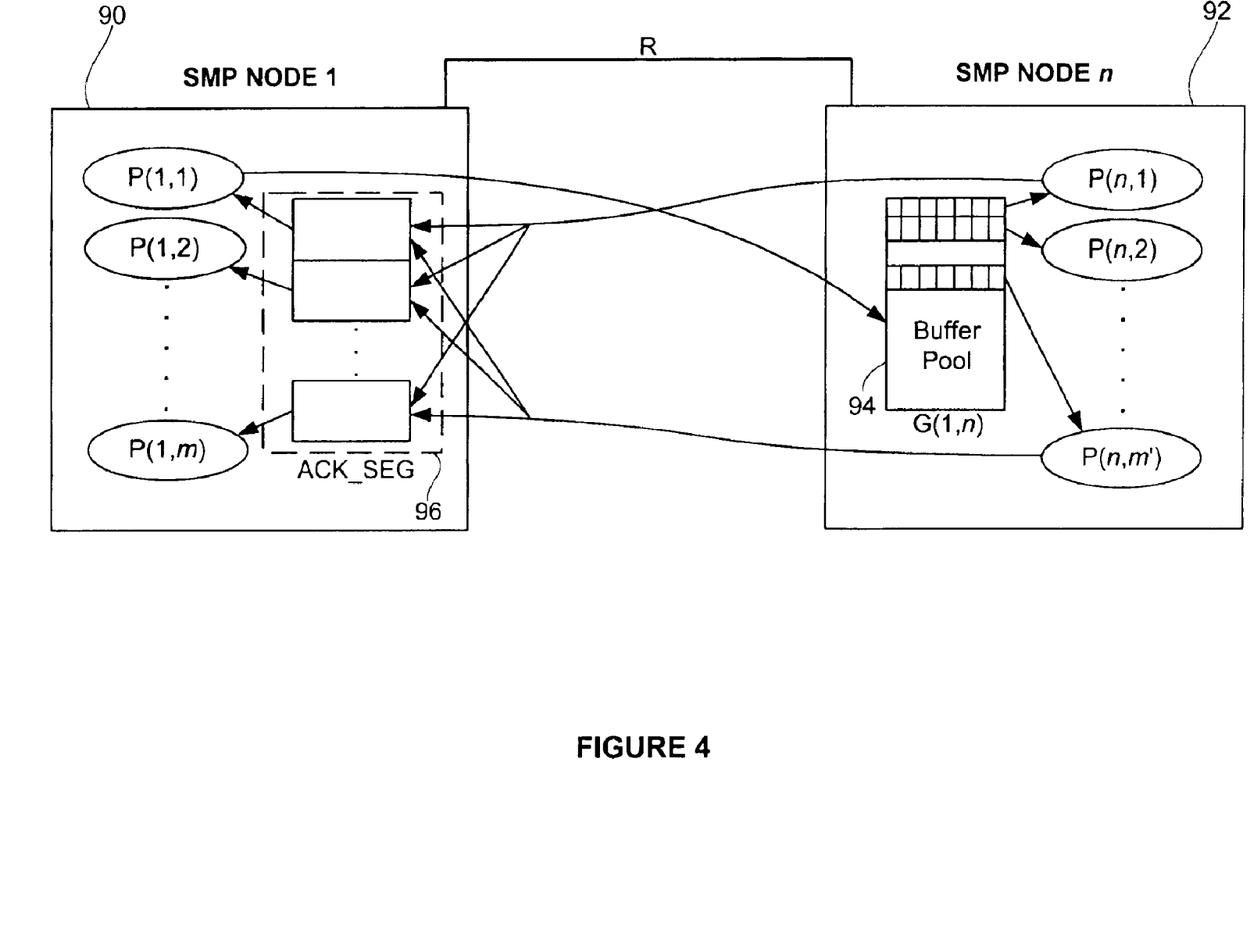
FIG. 4 shows a block diagram in accordance with an embodiment of the present invention.

FIG. 4 shows a block diagram of a message transfer mechanism in accordance with an exemplary embodiment of the present invention. FIG. 4 shows a cluster of two SMP nodes, SMP Node 1 (90) and SMP Node n (92), along with memory segments, i.e., memory space, used for message passing. Although FIG. 4 shows a cluster of only two SMP nodes, the following discussion with reference to FIG. 4 can be applied to any number of SMP nodes.

SMP Node 1 (90) and SMP Node n (92) are connected by a network "R" (shown in FIG. 4), which, for the purposes of this embodiment, supports the RSM protocol. SMP Node 1 (90) contains processes P(1,1) through P(1,m), where m represents the number of processes on SMP node 1 (90). SMP Node n (92) contains processes P(n,1) through P(n,m'), where m' represents the number of processes on SMP node n (92). Note that the first ordinal number for a process indicates the number of the node on which the process resides.

Prior to the commencement of any message transfer, the processes have to create memory segments on respective nodes before depositing messages for processes on those nodes. The creation of these segments may occur on a per segment basis when required. The postponement of segment creation until segment creation is required is called lazy segment creation, and is described below with reference to FIG. 6, FIG. 7, and FIG. 8.

Each process P(n,m) is allocated memory segments G(m, 1) through G(m,n) on its node and other nodes in a cluster, where m represents the process number and n represents the number of the node on which the process or allocated memory segment resides. For example, a process P(1,2) can communicate with a process P(3,4) by depositing a message in memory segment G(2,3), which resides on node 3.

Note that the second ordinal number for a process indicates the process number on only the node indicated by the first ordinal number. In other words, the second ordinal is only bounded by the number of processes on the node indicated by the first ordinal. For example, the process P(1,2) refers to the second process on the first node whereas process P(3,4) refers to the fourth process on the third node. In other words, the second ordinal is only bounded by the number of processes on the node indicated by the first ordinal.

In addition to delaying memory segment creation until it is necessary, simplex, i.e., one way, connections for message passing may be established. Such connections may be used when a process sends a message to another process in a cluster without message transfer in the reverse direction. In this situation, the process that received the message establishes a memory segment (96) (also referred to in FIG. 4 as "ACK$_{13}$SEG") to write an acknowledgment indication (referred to as "ACK") on the node on which the process that sent the message resides.

The creation of ACK memory segments, like the one (96) shown in FIG. 4, may also be done in a lazy manner such that an ACK memory segment is dynamically created on a first node to receive ACKs from processes on a second node when a process from the first node sends a message to a process on the second node. The structure of the ACK memory segment (96) is described in detail with reference to FIG. 5.

Referring still to FIG. 4, process P(1,1) on SMP node 1 (90) communicates with process P(n,1) by first attempting to deposit a message in a postbox in memory segment G(1,n) (94) on SMP node 2 (92). If the message is too large to fit within a postbox in G(l,n) (94), then the message is loaded into a buffer block allocated from a buffer pool in G(1,n), and the sending process, P(1,1) stores a pointer to that buffer block in the postbox. Thereafter, the receiving process, P(n,1) may retrieve the message by copying the message from the postbox to its region of memory, or in the latter case, by using the pointer stored in the postbox by process P(1,1) to identify the buffer block into which the message was loaded, and then copying the message from the buffer block to its common region of memory. Process (n,1) then acknowledges the receipt of the message by writing an ACK message into a corresponding ACK slot in ACK$_{13}$SEG (96).

When a sending process sends a message, the percentage of memory that can be used for the message is dependent upon the amount of memory available in the sending process's buffer pool and the number of receivers that the sending process may potentially send messages to. This ensures that a sending process cannot use all the memory in its buffer pool for sending a message to one receiving process. The value of the percentage of memory that can be used by a sending process for a message may be pre-defined by a system user or dynamically modified by the system during actual operation.

Although the discussion with reference to FIG. 4 involves process P(1,1) sending a message to process P(n,1), the same procedure may be applied to all processes on SMP node 1 (90) and SMP node n (92) (as shown in FIG. 4). Further, FIG. 4 shows message passing and ACK writing between various sets of processes aside from between P(1,1) and P(n,1).

In an alternative embodiment, the creation of a sending process's buffer pool on a remote node, i.e., a node on which the receiving process resides that is different from the node on which the sending process resides, is delayed until the sending process needs to send a message to a receiving process on that remote node.

In another embodiment, memory allocation is reduced by establishing simplex connections between process pairs. Simplex connections, as opposed to duplex connections, are one way communication channels. In this embodiment, a sending process can send a message to a receiving process on a remote node and receive acknowledgments from the receiving process indicating to the sending process that the message was received without the establishment of a data buffer. For example, a process P(i) can send data to process P(j) on a remote node, but P(j) never needs to send data back to P(i). The acknowledgment indication is still feasible (as described below) and net memory connection is reduced because duplex connection establishments are delayed until necessary.

Figure 5:
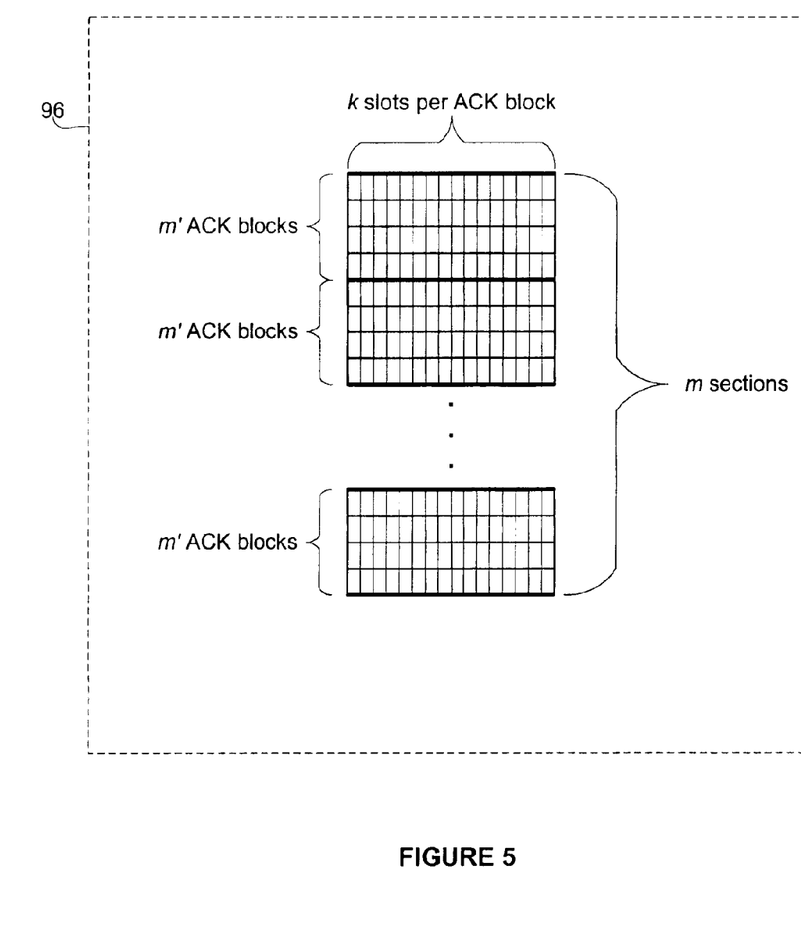
FIG. 5 shows a block diagram in accordance with an embodiment of the present invention.

Referring to FIG. 5, a structure of an acknowledgment ("ACK") memory segment (also referred to as "ACK segment") (96) is shown in accordance with an exemplary embodiment of the present invention. As discussed above, during the process of memory segment creation used for depositing messages, an ACK memory segment is dynamically created on a first node to receive ACKs from processes on a second node when a process from the first node sends a message to a process on the second node.

Consider that the ACK segment (96) shown in FIG. 5 is created for SMP Node 1 and SMP Node 2 and resides on SMP Node 1. If SMP Node 1 has m processes and SMP Node 2 has m' processes, then the ACK memory segment (96) is first divided into m sections, one section for each process on SMP Node 1, and each section, in turn, is further divided into m' ACK blocks, one ACK block for each process on SMP Node 2. Each ACK block consists of k slots, one for each postbox used for sending messages between processes on both the nodes in a node pair (a pair of SMP nodes).

When a process P(i) on SMP Node 1 sends a message to process P(j) on SMP Node 2 (not shown) by depositing a message into a memory segment G(i,2) (according to the mechanism described above with reference to FIG. 4), P(j) acknowledges the receipt of the message by writing an ACK message, i.e., an acknowledgment indication, into the corresponding ACK slot location in an ACK block "j" in section "i" of the ACK segment on SMP Node 1.

The creation of ACK segments is done in a "lazy" manner such that ACK segments are created on a node to receive ACKs if a process from that node sent a message to a process on the node for which the ACK segment is being created for. This technique is time efficient, because it saves time by not creating all potential ACK segments at the start of a system run. Further, this technique is space efficient, because it avoids creating memory segments that may not be required at all.

Figure 6:
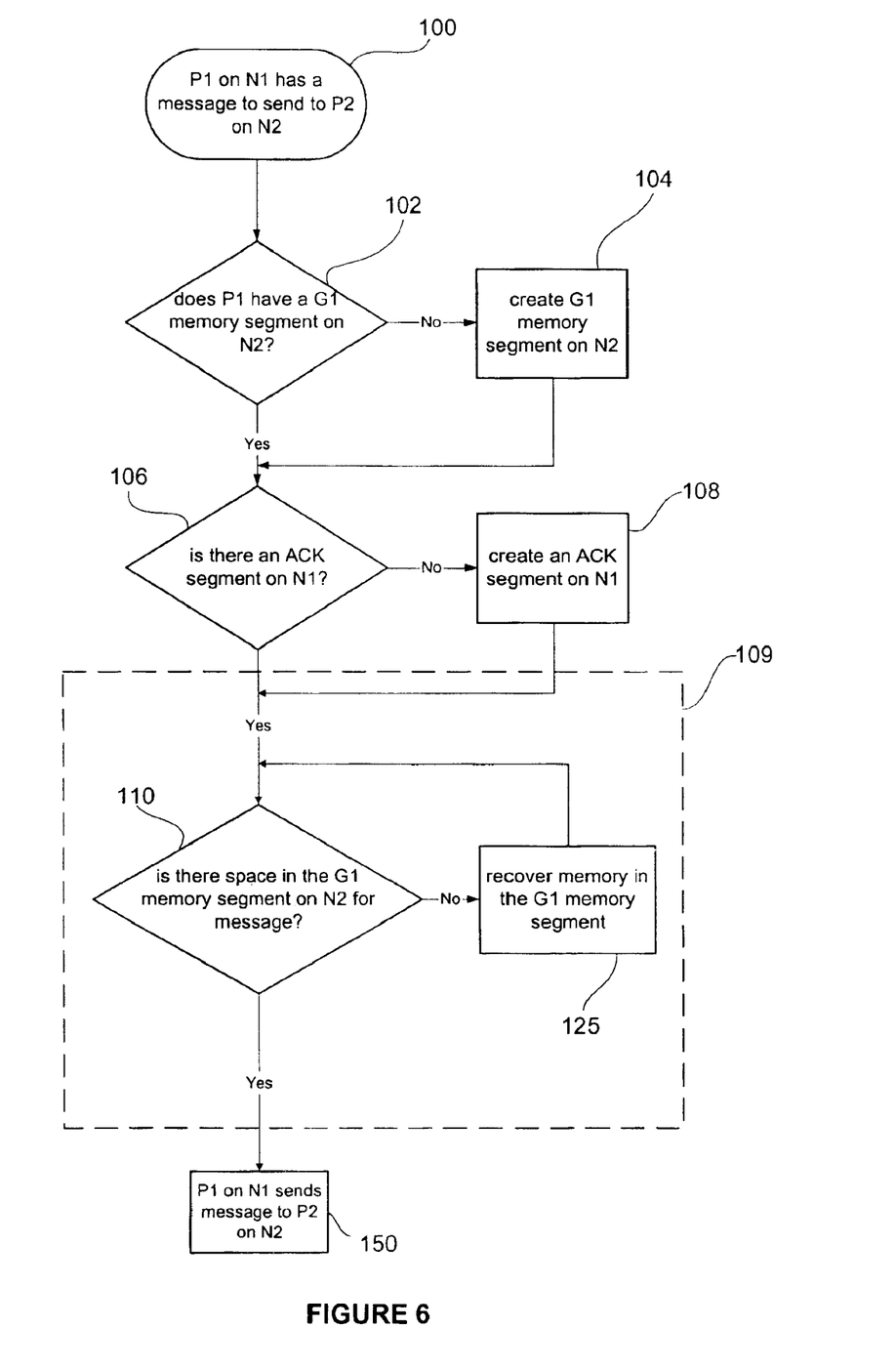
FIG. 6 shows a flow process in accordance with an embodiment of the present invention.

FIG. 6 shows an exemplary flow process in accordance with an embodiment of the present invention. The process begins when a first process, P1, on a first node, N1, has a message to send to a second process, P2, on a second node, N2 (step 100). Thereafter, the flow process entails determining whether P1 has a memory segment, G1, on N2 (step 102). If P1 does not have a G1 memory segment on N2, a G1 memory segment on N2 is created (step 104). After creating the G1 memory segment on N2 (step 104) or if there already was a G1 memory segment on N2, the flow process next entails determining whether there is an ACK segment, A1, on N1 (step 106). If there is not an ACK segment on N1, an ACK segment on N1 is created (step 108). After creating the ACK segment on N1 (step 108) or if there already was an ACK segment on N1, the flow process enters a memory recovery stage (109).

The memory recovery stage (109) entails determining whether there is space in the G1 memory segment on N2 for the message (step 110). If there is not space for the message in the G1 memory segment on N2, memory in the G1 memory segment is recovered (step 125) until enough space has been recovered to allow the message to be stored in the G1 memory segment. Once enough memory is recovered to store the message in the G1 memory segment or if there already was enough memory to store the message in the G1 memory segment, the flow process exits the memory recovery stage (109), and P1 on N1 sends a message to P2 on N2 (step 150).

In another embodiment of the present invention, a message sent by a sending process to a receiving process is broken down into smaller pieces such that the memory used to send an earlier piece of the message can be reused to send a later piece of the message to the receiving process.

In an alternative embodiment of the present invention, a sending process maintains a circular list of receiving processes to which it has sent messages. The receiving processes are maintained on the list in the order they were communicated to by a sending process, e.g., the receiving process to which a message was sent last is at the end of the list. The list is circular because the last receiving process on the list is followed by the first receiving process on the list. In other embodiments, the receiving processes may be maintained on the list according to the order which receiving processes received pieces of one or more messages.

In another embodiment of the present invention that implements the circular list mentioned above, a count of the number of buffer pool blocks used is maintained for each receiving process. If a sending process needs to allocate buffer pool blocks, i.e., memory, to a receiving process and has no memory available, the sending process attempts to recover memory allocated to the same receiving process earlier and reuses the memory if such memory is available. Receiving processes that do not consume any buffer pool blocks are removed from the circular list. In other embodiments of the present invention, the sending process can traverse its circular list and recover buffer pool blocks, i.e., memory, it used earlier to send to other receiving processes on the same node as the node on which the receiving process that the sending process is trying to send to resides. Further, these embodiments of the present invention may be used in a single SMP system or in a multiple SMP environment, e.g., RSM model.

Figure 7:
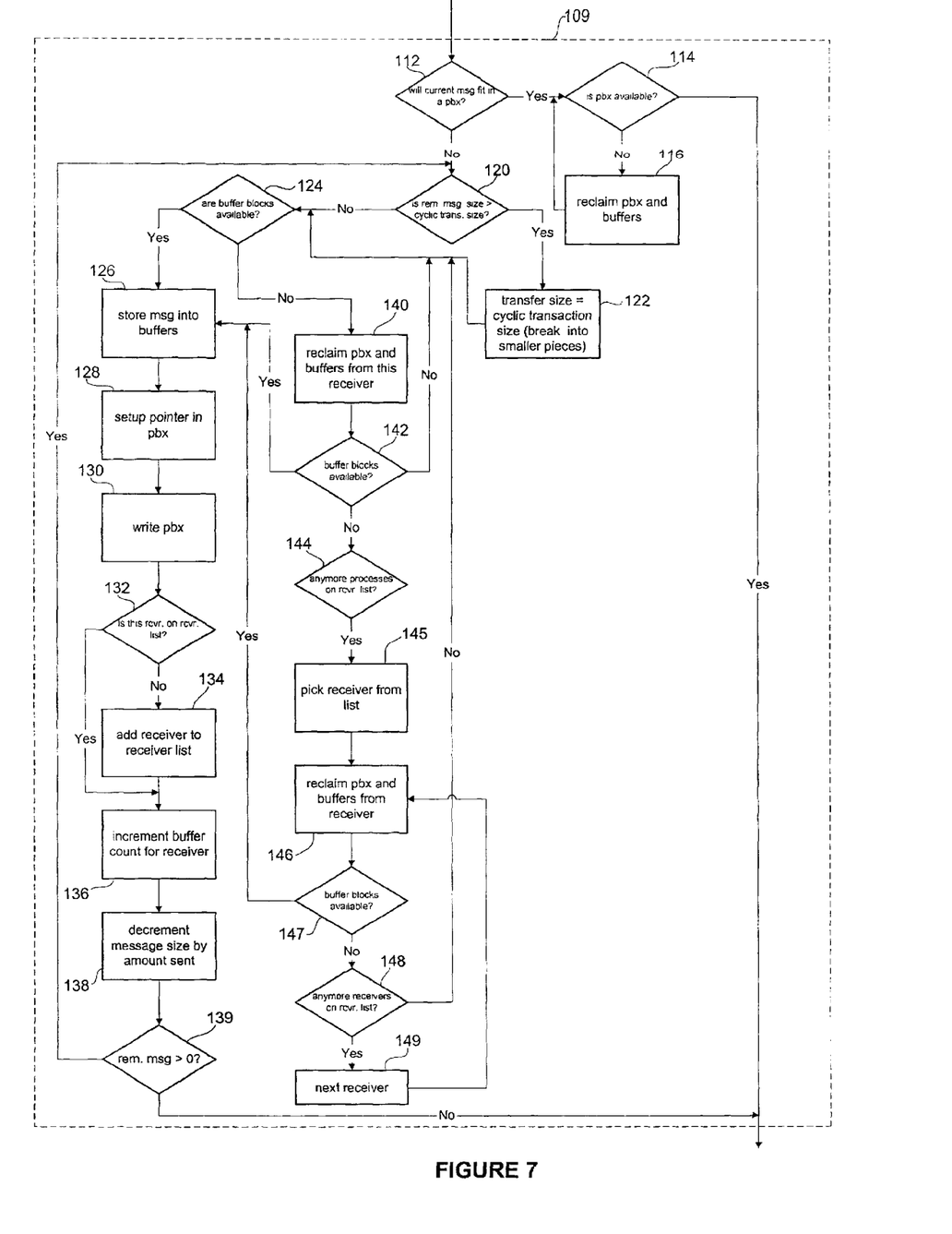
FIG. 7 shows a flow process in accordance with the embodiment shown in FIG. 6.

FIG. 7 shows an exemplary flow process in accordance the embodiment shown in FIG. 6. Specifically, FIG. 7 shows a detailed flow process within the memory recovery stage (109). The flow process shown in FIG. 7 is an expansion of the steps of the memory recovery stage (109) shown in FIG. 6. Further, the embodiment in FIG. 7 uses circular lists as described above.

The flow process begins with entering the memory recovery stage (109) and then determining whether a current message will fit into a postbox (step 112). If the current message will fit into a postbox, the flow process next determines whether a postbox is available (step 114). If a postbox is not available, an attempt is made to reclaim other postboxes and buffers (step 116). The flow process continues to reclaim postboxes and buffers (step 116) until a postbox becomes available (step 114). Once a postbox does become available, the current message is deposited into the now available postbox and the flow process exits the memory recovery stage (109).

In the case that a message will not fit into a postbox, a determination is made as to whether the size of a remaining message, i.e., a message sent before the current message that is still waiting to be fully sent, is greater than a maximum cyclic transaction size at which a message can be sent (step 120). If the remaining message's size is greater than the cyclic transaction size, the remaining message is broken into smaller pieces such that the size of potential message transfers is less than or equal to the cyclic transaction size (step 122). Once a remaining message is broken down into smaller pieces (step 122) or if the size of the remaining message was already less than or equal to the cyclic transaction size, the flow process next entails determining whether any buffer blocks are available (step 124) to store the remaining message or piece thereof.

If there are any buffer blocks available, the remaining message or piece thereof are stored into an available buffer block (step 126). Next, a pointer is set up and written in a postbox to indicate the location of the buffer block in which the remaining message or piece thereof was stored (steps 128 and 130). Thereafter, the flow process entails determining whether a receiver, i.e., a receiving process to which a message is ultimately sent, for the remaining message is on a receiver list, i.e., a list that is maintained to track receiving processes (step 132). If the receiver is not on the receiver list, the receiver is added to the receiver list (step 134). After adding the receiver to the receiver list (step 134) or if the receiver was already on the receiver list, a buffer count for the receiver, i.e., an amount of buffers that the receiver is using, is incremented (step 136). Thereafter, the remaining message or piece thereof is sent and the remaining size of the remaining message is decremented by the amount sent (step 138). Next, the flow process entails determining whether there are any remaining messages left (step 139). If there are not any remaining messages left, including the current message, the flow process exits the memory recovery stage (109). However, if there are remaining messages left, the flow process cycles back to the step that entails determining whether the size of the next remaining message is greater than the cyclic transaction size (step 120).

In the case the no buffer blocks are available, an attempt is made to reclaim postboxes and buffers previously used for the receiver of the remaining message (step 140). Next, the flow process entails determining whether any buffer blocks have become available (step 142) after the attempt to reclaim postboxes and buffers for the receiver of the remaining message (step 140). If any buffer blocks become available, the flow process stores the remaining message or piece thereof into an available buffer block (step 126) and the flow process continues therefrom as described above. However, if no buffer blocks become available after the attempt to reclaim postboxes and buffers for the receiver of the remaining message (step 140), the flow process next entails determining whether there are other processes on the receiver list (step 144). If there are no other processes on the receiver list, the flow process goes to back to determining whether any buffer blocks are available (step 124) and continues therefrom as described above. However, if there are other processes on the receiver list, the receiver at the head of the receiver list is picked (step 145), and an attempt is made to reclaim postboxes and buffers from the picked receiver (step 146). The flow process next entails determining whether any buffer blocks have become available (step 147). If any buffer blocks have become available, the flow process stores the remaining message or piece thereof into an available buffer block (step 126) and the flow process continues therefrom as described above. However, if no buffer blocks become available, the flow process next entails determining whether there are any other receivers on the receiver list (step 148). If there are other receivers on the receiver list, the flow process picks a next receiver (step 149), attempts to reclaim buffers and postboxes for that next receiver (step 146), and continues therefrom as described above. However, if there are no other receivers on the receiver list, the flow process goes to back to determining whether any buffer blocks are available (step 124) and continues therefrom as described above.

In other embodiments, the exemplary flow process shown in FIG. 7 may be applied to a plurality of process pairs on the same or different nodes transferring messages in parallel.

Figure 8:
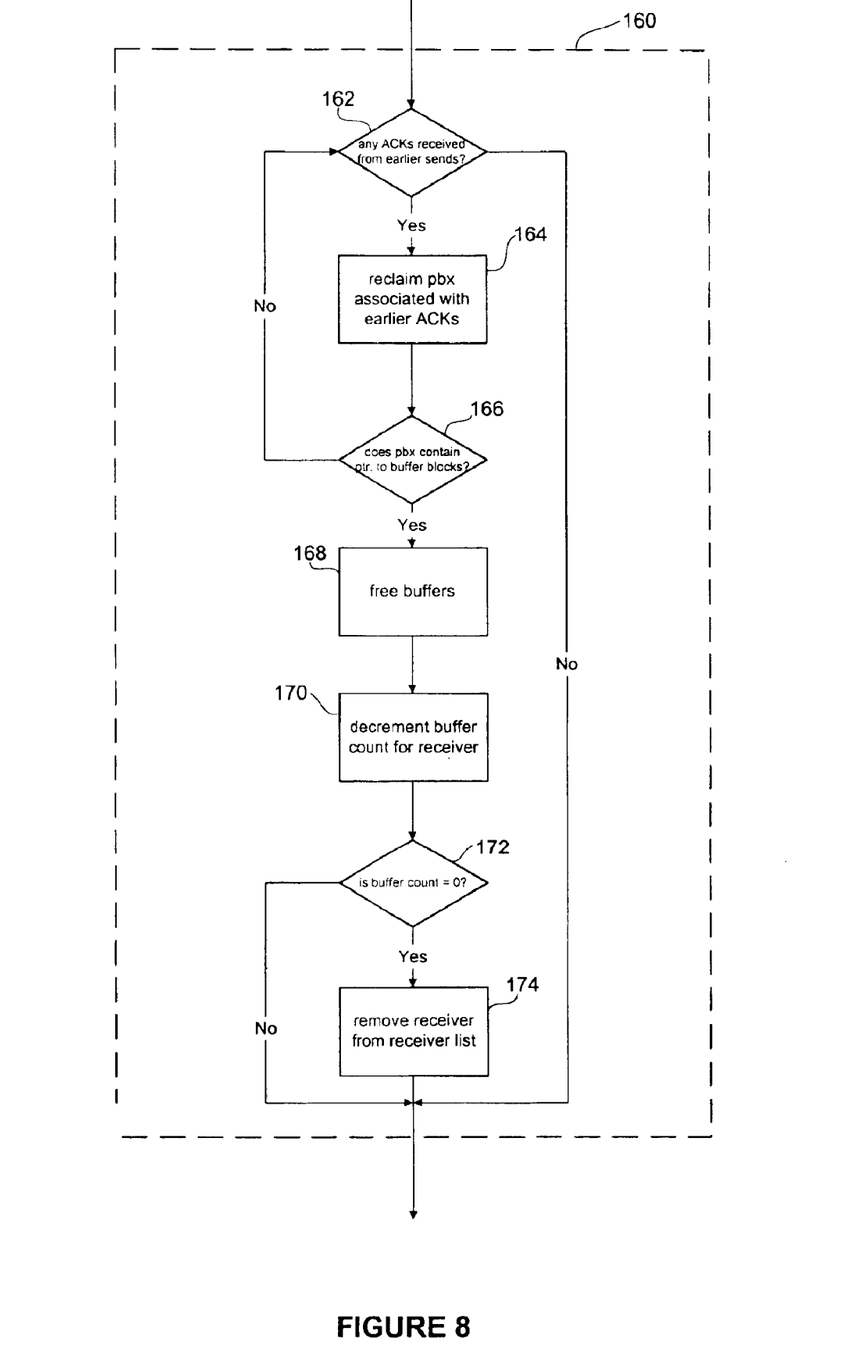
FIG. 8 shows a flow process in accordance with the embodiment shown in FIG. 7.

Referring to FIG. 8, an exemplary flow process is shown in accordance with the embodiment shown in FIG. 7. Specifically, FIG. 8 shows the flow process (also referred to as "memory reclamation stage (160)") corresponding to the reclaiming of postboxes and buffers as is done in steps 116, 140, and 146 of FIG. 7.

First, the flow process entails determining whether any ACKs from earlier sends, i.e., messages sent, have been received (step 162). If no ACKs have been received from earlier sends, this indicates that no receiving process has received a message since the last time the flow process checked whether any ACKs from earlier sends had been received, and the flow process consequently exits the memory reclamation stage (160).

However, if any ACKs have been received from earlier sends, this indicates that memory has become available because a receiving process has received a message and relinquished memory associated with storing the message after the receiving process copied it into its region of memory. In this case, the flow process attempts to reclaim postboxes associated with the ACKs received from earlier sends (step 164). The flow process next entails determining whether a reclaimed postbox contains a pointer to a buffer block (step 166). If there is not a pointer to a buffer block, the flow process cycles back to checking whether any ACKs from earlier sends have been received (step 162) and continues therefrom. However, if there is a pointer to a buffer block in a reclaimed postbox, the buffer block pointed to by the pointer is designated 'free' for use by processes attempting to transfer messages (step 168). Next, the count of buffer blocks used by the receiver associated with the reclaimed buffer block is decremented by the amount of buffer blocks 'freed' (step 170) (a postbox may contain more than one pointer pointing to more than one buffer block). The flow process then entails determining whether the count of buffer blocks used by that receiver is now zero (step 172). If the count of buffer blocks is zero, then that receiver is removed from the receiver list (step 174) because it no longer is associated with any unavailable memory. Thereafter, or if the buffer block count for that receiver is not zero, the flow process exits the memory reclamation stage (160).

Advantages of the present invention may include one or more of the following. As is described above, a sending process maintains a list of receiving process to which it has sent messages. Further, receiving processes that are no longer using any memory units are deleted from the list. By using the list, the sending process can reclaim memory without having to search all receiving processes on a node. The sending process, therefore, searches among receiving processes that will or already have abandoned memory as opposed to searching through all receiving processes, which may or may not yield available memory. Further, a process can reclaim memory it used to send a message to a process and reuse it to send messages to the same process or another process on the same node. Maintaining a list of receiving processes in the manner described above reduces the time necessary to reclaim memory and makes process communication more efficient.

Another advantage is that total memory consumption is reduced by improving the connection establishment between processes such that connections are established dynamically during the lifetime of a particular program. By delaying an establishment of a connection until a sending process needs to send a message to a remote node, the creation of a sending process's buffer pool on a remote node is accordingly delayed. This technique reduces total memory because only a subset of all potential connections is established.

An additional advantage is that as only a subset of potential connections is established, program execution initialization time is reduced because unnecessary connections are not established during the initialization time.

A further advantage is that memory allocation is reduced by establishing simplex connections where possible. Such simplex connections allow for a sending process to send a message to a receiving process and also allow for a sending process to receive acknowledgment indications from a receiving process without creating a reverse connection, i.e., a duplex connection. It follows that memory consumption is approximately halved and duplex connection establishment is postponed until a receiving process needs to send data aside from an acknowledgement indication back to the receiving process.

Another advantage is that a separate acknowledgement segment is created for receiving acknowledgement indications from receiving processes. Because data and acknowledgement segments are separate buffer pools, simplex connections between a sending process and a receiving process can be maintained.

Yet another advantage is that memory consumption is reduced because a receiving process writes an acknowledgement bit into an acknowledgement indication segment instead of having to send a message to a data segment, i.e., buffer, which can be significantly larger than a byte. This eliminates the need to create buffer pools on a node unless a process needs to write data to that node.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of transmitting a first message from a first process on a first node to a second process on a second node, the method comprising:

the first process defining a first process memory space on the second node, wherein the first process memory space is written to by the first process;

the first process assigning a separate postbox portion of the first process memory space for each respective process on the second node; and the first process storing the first message in the first process memory space and a first message indicator in the postbox portion of the first memory space assigned to the second process.

wherein the first process memory space on the second node is defined on a per segment basis.

2. The method of claim 1, wherein the first message indicator comprises location information of the first message in the first process memory space.

3. The method of claim 2, further comprising:
the second process polling its respective postbox portion of the first process memory space; and
upon the second process detecting the first message indicator in its respective postbox portion of the first process memory space, the second process retrieving the first message from the first process memory space dependent upon the location information in the first message indicator.

4. The method of claim 1, further comprising:
the first process determining whether the first message can be stored in the first process memory space.

5. The method of claim 4, further comprising:
the first process determining that the first message cannot be stored in the first process memory space if the first message is larger than a predetermined number of bytes.

6. The method of claim 1, further comprising:
the first process preparing a second message to send to a third process on the second node;
the first process determining whether the second message can be stored in the first process memory space; and
if the first process determines that the second message can be stored, the first process storing the second message in the first process memory space and a second message indicator in the postbox portion of the first process memory space assigned to the third process.

7. The method of claim 1, further comprising:
the first process maintaining a list of messages sent to other process; and
the first process adding information with respect to the first message to a list.

8. A method of transmitting a first message from a first process to a second process on a second node, a first process memory space being provided on the second node, the first process memory space comprising separate postbox portions for each respective process on the second node, wherein the first process memory space is written to by the first process, the method comprising:
the first process determining if the postbox portion for the second process can store a first message indicator for the first message;
if the postbox portion for the second process can store the first indicator for the first message, the first process determining if there is sufficient unallocated first process memory space available to store the first message;
if there is sufficient unallocated first process memory space, the first process storing the first message in the first process memory space; and
storing the first message indicator in the postbox portion of the first process memory space assigned to the second process,
wherein the first process memory space is allocated on a per segment basis.

9. The method of claim 8, wherein the first message indicator comprises location information of the first message in the first process memory space.

10. The method of claim 8, further comprising:
if there is insufficient unallocated first process memory space available, the first process accessing a first list of second node processes to which the first process has sent messages to identify a portion of the first process memory space to be unallocated in order to make available first process memory space in which to store the first message.

11. The method of claim 8, further comprising:
if there is insufficient unallocated first process memory space available:
the first process identifying a portion of the first process memory space storing a second message that has already been retrieved by the second process; and
the first process making the identified portion of the first process memory space available to store the first message.

12. The method of claim 8, further comprising:
if there is insufficient unallocated first process memory space available:
the first process identifying a portion of the first process memory space storing a second message that has already been retrieved by a third process on the second node to which the second message was sent; and
the first process making the identified portion of the first process memory space available to store the first message.

13. The method of claim 12, wherein the first process determines that the second message has been retrieved by the third process by determining that an acknowledgment message has been received from the third process with respect to the second message.

14. A computing node, comprising:
a first process memory space including a separate postbox portion for each process on the node, the first process memory space to be written to by a first process on a second node; and
means for each process on the computing node to access a respective postbox portion to retrieve a message indicator identifying a location in the first process memory space of a message from the first process to the respective process on the computing node,
wherein the first process memory space is allocated on a per segment basis.

15. The computing node of claim 14, further comprising a plurality of processors.

16. A method for managing memory when one of a plurality of process on a first node attempts to store a current message in a memory space on a second node, the method comprising:
determining whether any acknowledgment signals have been received by the first node from a receiver of a previously sent message that used memory in the memory space, wherein the memory space is accessible to any of the plurality of processes;
selectively reclaiming a postbox associated with the previously sent message if an acknowledgment signal has been received from the receiver of the previously sent message; and
storing the current message if the postbox associated with the previously sent message is reclaimed.

17. The method of claim 16, further comprising:
determining whether the postbox contains a pointer to a buffer block; and selectively deallocating the buffer block if the postbox contains a pointer to the buffer block.

18. The method of claim 17, further comprising:

decrementing a buffer count for the receiver of the previously sent message based on the freeing of the at least one buffer block.

19. The method of claim 18, wherein the buffer count is maintained to track a number of buffers blocks associated with the receiver of the previously sent message.

20. The method of claim 18, further comprising:

determining whether the buffer count for the receiver of the previously sent message is zero; and selectively removing the receiver of the previously sent message from a receiver list if the buffer count for the receiver of the previously sent message is zero.

21. The method of claim 20, wherein the receiver list is maintained to track a plurality of receiving processes.

22. A method for handling message transfers by selectively transferring a message in pieces, the method comprising:

determining whether a size of a remaining message for a receiving process is greater than a cyclic transaction size; and storing the remaining message into a memory space if the size of the remaining message for the receiving process is not greater than the cyclic transaction size.

23. The method of claim 22, further comprising:

selectively breaking down the remaining message into smaller pieces if the size of the remaining message is greater than the cyclic transaction size.

24. The method of claim 23, wherein selectively breaking down the remaining message into smaller pieces is done such that memory used to send a piece of the remaining message can be reused to send a subsequent piece of the remaining message.

25. The method of claim 22, wherein the cyclic transaction size is the maximum amount of memory that can be used to send a message, and wherein the cyclic transaction size is the maximum amount of memory that can be used to send a piece of a message.

26. The method of claim 22, further comprising:

attempting to recover memory allocated to send a previous message to the first receiving process in order to send the remaining message to the first receiving process; and using the memory allocated to send the previous message if the attempt is successful.

27. The method of claim 22, further comprising:

maintaining a receiver list to track a plurality of receiving processes, and wherein the plurality of receiving processes on the receiver list are maintained in an order in which the plurality of receiving processes were communicated to by a sending process.

28. The method of claim 27, further comprising:

attempting to recover memory used by the plurality of receiving processes by traversing the receiver list; and selectively recovering memory from those receiving processes on the receiver list that reside on a node which is the same as the node on which the first receiving process resides.

29. The method of claim 27, further comprising:

counting a number of buffer pool blocks used by each of the plurality of receiving processes on the receiver list.

30. The method of claim 27, wherein individual receiving processes of the plurality of receiving processes are removed from the receiver list if those individual receiving processes do not consume any buffer pool blocks.

31. A method for creating and handling a data memory segment and an acknowledgment segment when a first process on a first node needs to send a message to a second process on a second node, the method further comprising:

determining whether there is a data memory segment for the first process on the second node;

creating the data memory segment for the first process on the second node if there is not already a data memory segment for the first process on the second node;

determining whether there is an acknowledgment segment on the first node; and creating the acknowledgment segment on the first node if there is not already an acknowledgment segment on the first node.

32. The method of claim 31, wherein the data memory segment is used to store the message, and wherein the acknowledgment segment is used by the second process to indicate to the first process that the second process has received the message.

33. The method of claim 31, wherein the acknowledgment segment is written into by the second process and read from by the first process.

34. The method of claim 31, wherein creating the data memory segment is done when the first process needs to send a message to the second process.

35. The method of claim 31, wherein creating the acknowledgment segment is done when the second process needs to indicate to the first process that the second process has received the message.

36. The method of claim 31, wherein the acknowledgment segment is selectively divided into m sections, and wherein m represents a number of processes on the first node.

37. The method of claim 36, wherein each of the m sections is selectively divided into n acknowledgment blocks, and wherein n represents a number of processes on the second node.

38. The method of claim 31, wherein the acknowledgment segment is used by a plurality of processes on the second node to send acknowledgment indications to the first node.

39. The method of claim 31, wherein the acknowledgment segment is created on each node in a pair of nodes.

40. The method of claim 31, further comprising:

selectively establishing a simplex connection between the first process and the second process, wherein the simplex connection is a one way communication channel between the first process and the second process.

41. The method of claim 31, further comprising:

sending a second message from the first process on the first node to a third process on a third node.

* * * * *